US00RE47387E

(19) United States
(12) Reissued Patent
Persons, Jr. et al.

(10) Patent Number: US RE47,387 E
(45) Date of Reissued Patent: May 14, 2019

(54) DEVICE AND METHODS FOR INSTALLING ELEVATOR CAB INTERIOR WALL PANELS

(71) Applicant: G & R Elevator Manufacturing, Inc., Andover, MN (US)

(72) Inventors: Ken Persons, Jr., Clear Lake, MN (US); Darren Maveus, Andover, MN (US); Steve Hudak, Big Lake, MN (US)

(73) Assignee: G & R Elevator Manufacturing, Inc., Andover, MN (US)

(21) Appl. No.: 15/271,623

(22) Filed: Sep. 21, 2016

Related U.S. Patent Documents

Reissue of:
(64) Patent No.: 9,156,658
Issued: Oct. 13, 2015
Appl. No.: 13/964,412
Filed: Aug. 12, 2013

(51) Int. Cl.
*B66B 11/02* (2006.01)

(52) U.S. Cl.
CPC ..... *B66B 11/0253* (2013.01)

(58) Field of Classification Search
CPC . B66B 11/0253; E04B 2/4557; E04D 12/004; E04D 2001/3414; E04D 1/34; E04F 13/07; E04F 13/0851; E04F 13/0803
See application file for complete search history.

(56) References Cited

U.S. PATENT DOCUMENTS 3,103,708 A * 9/1963 Pomeroy ..... B66B 11/0253 410/107
3,236,932 A * 2/1966 Grigas et al. ..... 52/543
3,321,883 A * 5/1967 Pascucci ..... 52/774
3,611,664 A * 10/1971 Barbera ..... 52/481.1
3,621,635 A * 11/1971 Lange ..... 52/235
3,631,942 A * 1/1972 Brounn ..... B66B 11/0253 187/401
3,903,670 A * 9/1975 Robinson, Jr. ..... 52/478
4,047,349 A * 9/1977 Aguilar, Jr. ..... 52/551
4,288,958 A * 9/1981 Chalmers et al. ..... 52/478
4,363,201 A * 12/1982 Bains ..... B66B 11/0253 52/584.1
4,462,193 A * 7/1984 Ericson ..... 52/282.4
4,480,360 A 11/1984 Brugman et al.
4,961,295 A * 10/1990 Kosch et al. ..... 52/36.5
(Continued)

FOREIGN PATENT DOCUMENTS

| | | |
|---|---|---|
| AU | 2010202033 | 12/2010 |
| EP | 0479733 | 8/1992 |
| EP | 2194208 | 4/2008 |

*Primary Examiner* — Patricia L Engle
(74) *Attorney, Agent, or Firm* — Winthrop & Weinstine, P.A.; Dipak J. Shah

(57) ABSTRACT

The present invention is directed to, inter alia, devices and methods for precision installation of elevator wall panels and intervening reveal strips in an elevator cab shell. Various embodiments comprise corner stays and intermediate stays with pre-installed clips thereon and with locating means installed thereon to facilitate accurate locating of adjacent stay(s) in order to greatly reduce the labor and time required to install the wall panels accurately. Further, various embodiments comprise pre-installed reveal strips on the stay(s) and that are interposed between each installed wall panel. Pre-installing the reveal strips further reduces the labor and time required at the installation site.

25 Claims, 8 Drawing Sheets

(56) References Cited

U.S. PATENT DOCUMENTS

| | | | | |
|---|---|---|---|---|
| 5,265,396 | A | 11/1993 | Amimoto | |
| 5,720,460 | A | 2/1998 | Watson | |
| 6,044,609 | A * | 4/2000 | Kim | 52/551 |
| 6,164,029 | A | 12/2000 | Lee | |
| 6,631,589 | B1 * | 10/2003 | Friedman et al. | 52/30 |
| 6,725,618 | B2 * | 4/2004 | Albracht | 52/489.1 |
| 7,043,884 | B2 | 5/2006 | Moreno | |
| 7,654,058 | B2 | 2/2010 | Hatzinikolas | |
| 8,096,091 | B2 * | 1/2012 | Cristina | 52/551 |
| 8,127,513 | B2 | 3/2012 | Gibbs | |
| 8,230,982 | B2 | 7/2012 | Friedman et al. | |
| 2007/0261348 | A1 | 11/2007 | Surowiecki | |
| 2010/0229484 | A1 * | 9/2010 | Carolan et al. | 52/302.1 |
| 2012/0192518 | A1 | 8/2012 | Delforte | |

* cited by examiner

DEVICE AND METHODS FOR INSTALLING ELEVATOR CAB INTERIOR WALL PANELS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[None] *This application is an application for reissue of U.S. Pat. No. 9,156,658, which is incorporated herein by reference in its entirety.*

BACKGROUND OF THE INVENTION

1. Field of the Invention

The present invention is directed to devices and methods for installing elevator cab interior wall panels. More particularly, an installation template for locating and installing elevator cab interior wall panels is provided.

2. Description of the Related Art

The interior of finished elevator cab shells typically comprise wall panels installed and mounted thereon. Typically, to complete the installation of the wall panels on the elevator cab shell, zee-type clips are pre-installed on rear side of the wall panels. These pre-installed zee clips require, in turn, mating clips to be field installed onto the elevator cab shell. These mating clips require accurately measured locating on the elevator cab shell in order to precisely mate up with the pre-installed zee clip on rear of the wall panel for hanging and securing installation.

There are typically a plurality of wall panels installed according to the above described method within a given elevator cab. Each of the wall panels must align with the other wall panels, both vertically and horizontally, to provide maximum aesthetic benefit. As a result, each individual mating clip requires a significant amount of measurement effort to obtain the proper installation location.

In a typical elevator cab shell, a total of 7, e.g., wall panels may be installed, though the skilled artisan will recognize that more or less wall panels may be installed in certain cab shells. Each wall panel may comprise a series of zee mounting clips, perhaps 6-8 per panel. Each of the zee mounting clips requires a separately located and installed wall mounting clip, to which the zee mounting clips are individually secured when the wall panel is finally hung. Thus, in this example, the installer will need to measure, locate and install very accurately 42 to 56 wall mounting clips. This is a time consuming, laborious process.

Further, vertical strips that are typically stainless steel or the like and known in the industry as "reveals", are typically installed in a vertical gap between successive wall panels to provide additional aesthetic benefit. These reveals also require precise measuring and installation so as to properly align with the adjacent wall panel(s), requiring further labor and time.

Thus, the current situation requires an installer of elevator cab wall panels and intervening reveal strips to be highly accurate in installation. This process is laborious, tedious and time consuming and, as a result, costly.

Various embodiments of the present invention address these, inter alia, problems.

SUMMARY OF THE INVENTION

The present invention is directed to, inter alia, devices and methods for precision installation of elevator wall panels and intervening reveal strips in an elevator cab shell. Various embodiments comprise corner stays and intermediate stays with pre-installed clips thereon and with locating means installed thereon to facilitate accurate locating of adjacent stay(s) in order to greatly reduce the labor and time required to install the wall panels accurately. Further, various embodiments comprise pre-installed reveal strips on the stay(s) and that are interposed between each installed wall panel. Pre-installing the reveal strips further reduces the labor and time required at the installation site.

The figures and the detailed description which follow more particularly exemplify these and other embodiments of the invention.

BRIEF DESCRIPTION OF THE DRAWINGS

The invention may be more completely understood in consideration of the following detailed description of various embodiments of the invention in connection with the accompanying drawings, which are as follows.

DETAILED DESCRIPTION OF THE INVENTION

Figure 1:
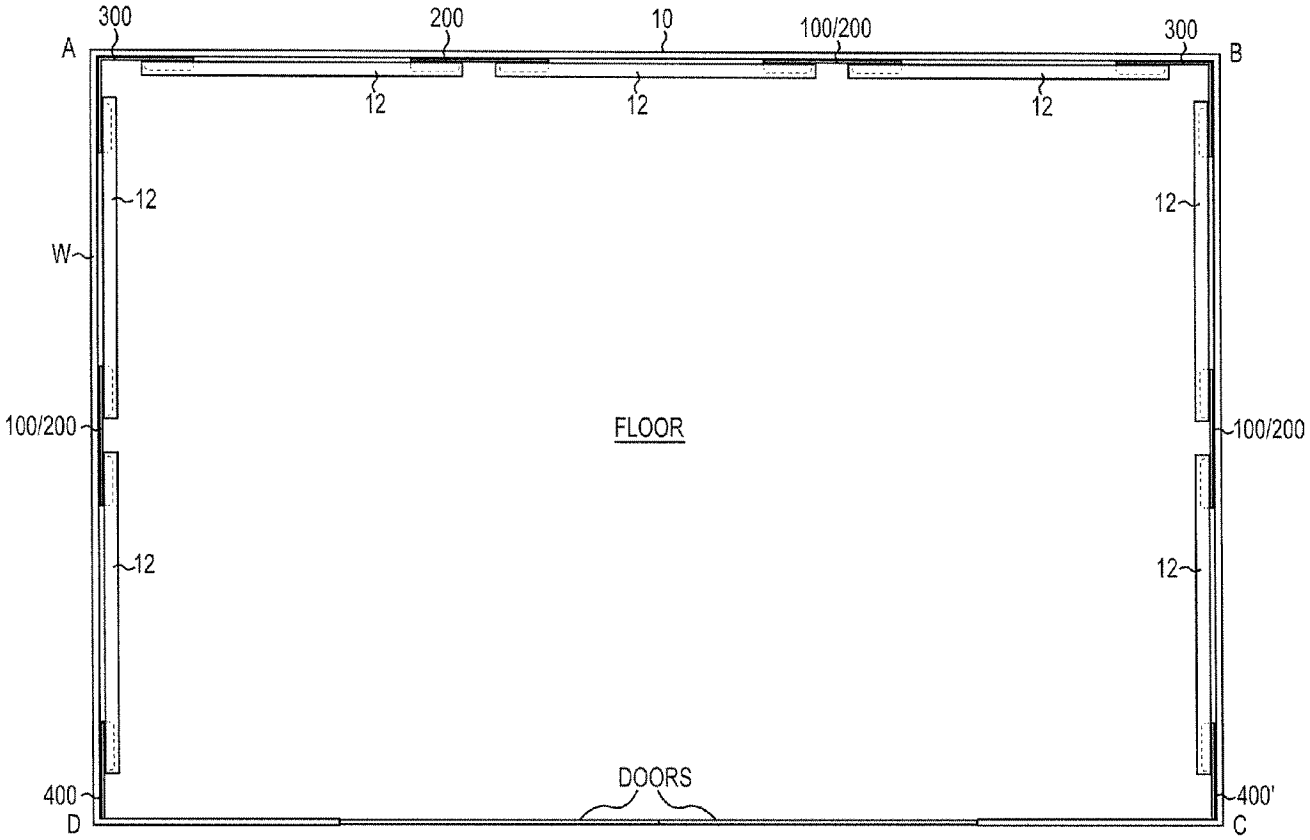
FIG. 1 is a top view of one embodiment of the invention installed within an elevator cab shell.

While the invention is amenable to various modifications and alternative forms, specifics thereof are shown by way of example in the drawings and described in detail herein. It should be understood, however, that the intention is not to limit the invention to the particular embodiments described. On the contrary, the intention is to cover all modifications, equivalents, and alternatives falling within the spirit and scope of the invention.

FIG. 1 illustrates a top view of an elevator cab shell 10 with one embodiment of the present invention installed on walls W within the elevator cab shell 10. Thus, wall panels 12 are installed on various stays of the present invention that are mounted on the walls W of the elevator cab shell 10, the walls W having a height, a floor and a ceiling as commonly understood by a person skilled in the art, the height being equal to the difference in distance or length between the ceiling and the floor as readily understood by the skilled artisan.

Figure 2:
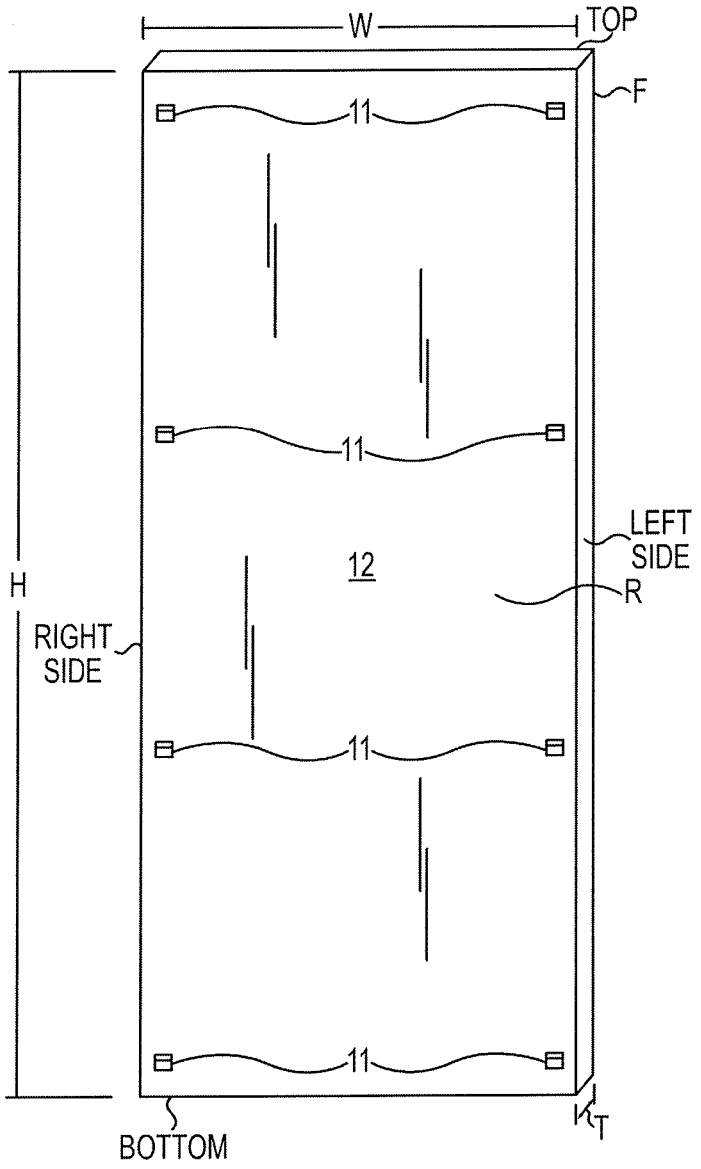
FIG. 2 is a perspective view of a wall panel for an elevator cab shell.
Figure 3:
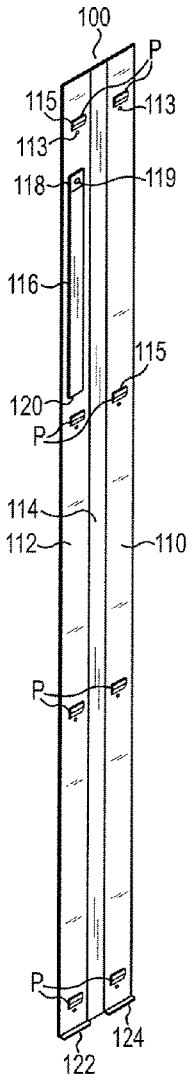
FIG. 3. is a perspective view of one embodiment of the present invention.
Figure 4:
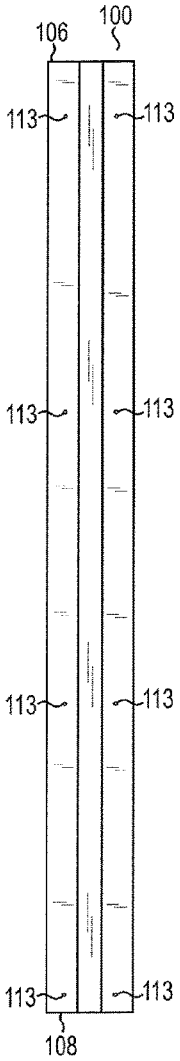
FIG. 4. is a rear view of one embodiment of the present invention.
Figure 5:
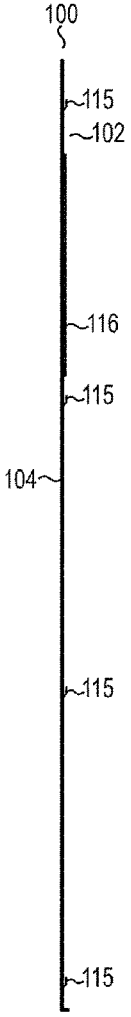
FIG. 5. is a side view of one embodiment of the present invention.
Figure 6:
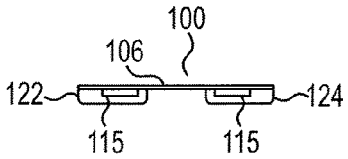
FIG. 6. is a top view of one embodiment of the present invention.

FIG. 2 illustrates one embodiment of a wall panel 12 that may be used with the embodiments of the stays of the present invention. Wall panel 12 comprises generally a top, a bottom, a height H which is the distance or length between top and bottom, right and left sides, a width W which is the distance or length between the right and left sides, a front side F, rear side R and a thickness T which is the distance or length between front side F and rear side R. A plurality of pairs of mounting clips 11 are shown mounted on the rear side R of wall panel 12. In the illustrated embodiment, four pairs of mounting clips 11 are shown as pre-installed on the rear side R of wall panel 12. The skilled artisan will recognize that the pre-installed plurality of pairs of mounting clips 11 may comprise a number of functional configurations. A particularly preferred but non-limiting pre-installed mounting clip comprising the plurality of pairs of mounting clips 11 comprises a zee-type clip which is well-known to the skilled artisan. Mounting clip 11 may comprise a pre-installed or pre-punched clip 11 or a clip 11 that is otherwise adhered to the wall panel 12 as the skilled artisan will readily recognize.

Generally, each of the pre-installed mounting clips in one of the pairs of the plurality of pairs of mounting clips 11 are precisely located in relation to the top, bottom, right and left sides of the wall panel 12. This allows very precise installation using the present invention.

Generally, various embodiments of a stay 100, 200, 300 for mounting a wall panel 12 on a wall W within an elevator cab shell 12 are illustrated in FIGS. 3-12.

FIGS. 3-7 illustrate stay 100 comprising a front side 102, a rear side 104, a top 106, a bottom 108, a right side 110, a left side 112, and a center portion 114 that is vertically integrated and disposed between the right side 110 and the left side 112. Stay 100 may comprise right side 110, left side 112 and center portion 114 being substantially parallel with each other.

In addition, a plurality of through holes 113, disposed on the right side 110, and left side 112, of the stay 100 are provided, as illustrated in pairs but may be in any configuration as understood by the skilled artisan. One half of through holes 113 pairs may be disposed on the right side 110 of stay 100 and the other half of the through holes 113 may be disposed on the left side 112 of the stay 100. Through holes 113 are provided for securing the stay to the wall W of the elevator cab shell 10 with a fastener (not shown as this is known to the skilled artisan, e.g., screw and the like).

A plurality of pairs P of pre-installed mounting clips 115 are also provided, each pair P of pre-installed mounting clips comprising a first mounting clip and a second mounting clip mounted on the front side 102, of the stay 100, wherein the first mounting clip of each pair P is pre-installed on the right side 110, of the stay at a distance D1, D2, D3, D4, from the top 106 of the stay 100, wherein D1 represents the distance from the top-most pair P to the top 106 of the stay 100, D2 represents the distance from the top 106 of the stay 100 to the pair P immediately below the topmost pair P, D3 represents the distance from the top 106 of stay 100 to the third pair P from the top 106 of stay 100 and D4 represents the distance from the top 106 of stay 100 to the lower-most pair P. Thus, a second mounting clip 115 of each pair P is pre-installed on the left side 112 of the stay 100 at the same distances, i.e., D1, D2, D3 and D4 from the top 106 of the stay 100 as the first mounting clip 115 of pair P. Pre-installed mounting clips 115 may comprise clips that are pre-punched in to the stays of the present invention or otherwise adhered to the stays of the present invention as will be readily understood by the skilled artisan.

In addition, stay 100 comprises at least one pre-installed locator 116 operatively connected to the stay 100, the at least one pre-installed locator 116 comprising a connected end 118 whereby the pre-installed locator 116 is connected to the front side 102 of the stay 100, a distal end 120 and a length L, whereby the pre-installed locator 116, precisely locates the position for the installation of an adjacent stay on the elevator cab shell wall W. In this embodiment, pre-installed locator 116 is operatively connected to the left side 110 of the front 102 of stay 100.

Figure 7:
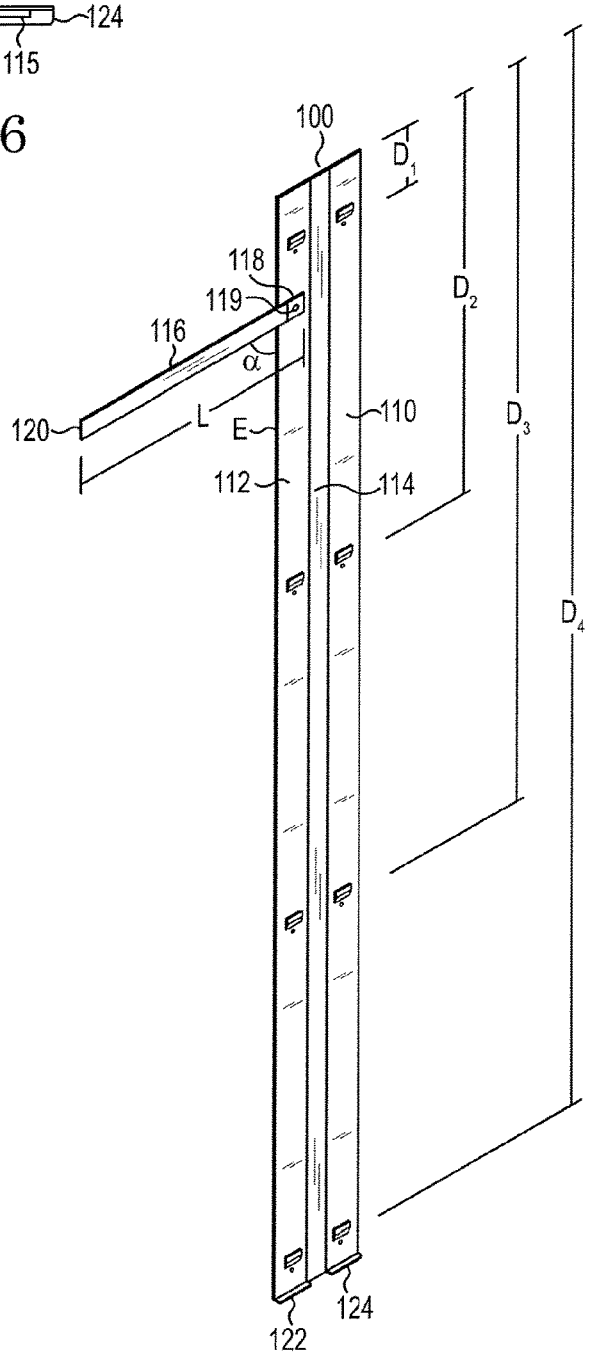
FIG. 7. is a perspective view of one embodiment of the present invention.

Pre-installed locator 116 may comprise a fixed deployed position as illustrated in FIG. 7, where the pre-installed locator 116 is fixed at angle $\alpha$ with respect to the edge E of stay 100. Preferably, this angle $\alpha$ is fixed at 90 degrees. Alternatively, and most preferably, pre-installed locator 116 may comprise at least two positions, a stored position and a deployed position, wherein the pre-installed locator 116 is rotatable or otherwise moveable between the stored position and the deployed position. In this preferred embodiment, pre-installed locator 116 comprises a connector 119 that allows the locator 116 to rotate around connector 119 from the stored position as illustrated in, e.g., FIG. 3 to the deployed position illustrated in FIG. 7. As with the fixed position configuration for pre-installed locator 116 described above, the preferred angle $\alpha$ for the rotatably achieved deployed position is 90 degrees, though other angles are of course possible as will be appreciated by the skilled artisan. In practice, the pre-installed locator 116 when in the deployed position, either as a consequence of rotation away from the stored position or in the fixed position embodiment, is used to precisely mark the position, i.e., the precise horizontal distance, of an adjacent stay on the elevator cab shell wall W from the installed stay 100 during installation of wall panels 12.

Various embodiments of the stay 100 further comprise a first lip 122 disposed at the bottom 108 of the right side 110 of the stay 100, and a second lip 124 disposed at the bottom 108 of the left side 112 of the stay 100, each of the first 122 and second 124 lips extending outwardly from the front side 102 of the stay 100 a distance that is equal to or less than the thickness T of the wall panel 12 as discussed supra in connection with FIG. 2. In certain embodiments, wall panels 12 may be supported by lips 122, 124 as will be described further infra during installation.

Figure 8:
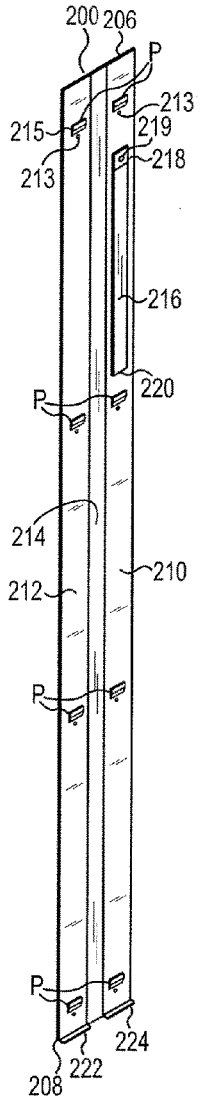
FIG. 8. is a perspective view of one embodiment of the present invention.
Figure 9:
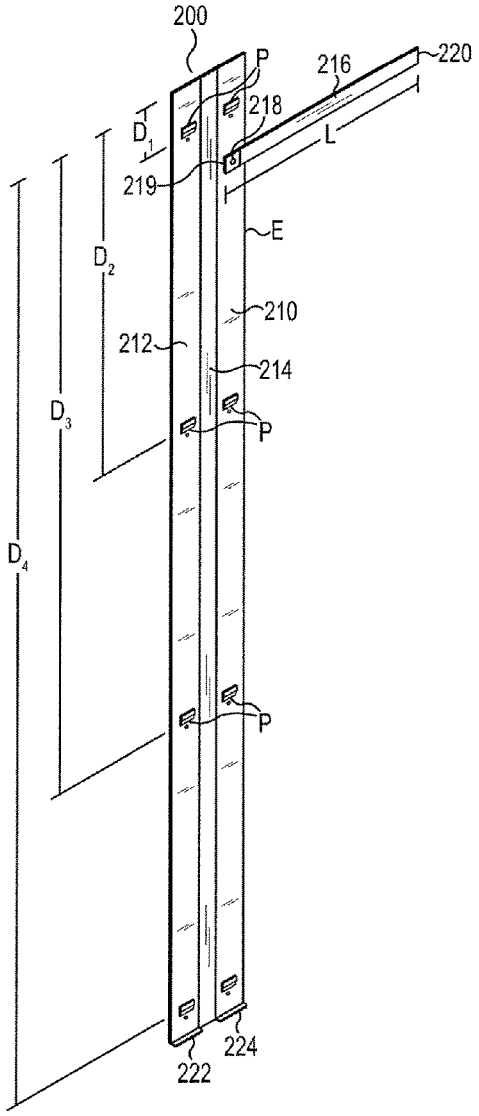
FIG. 9. is a perspective view of one embodiment of the present invention.

FIGS. 8-9 illustrate another stay embodiment 200 which is essentially a mirror image of stay 100 described above. Thus, stay 200 may comprise a front side 202, a rear side 204, a top 206, a bottom 208, a right side 210, a left side 212, and a center portion 214 that is vertically integrated and disposed between the right side 210 and the left side 212. Stay 200 may comprise right side 210, left side 212 and center portion 214 being substantially parallel with each other.

In addition, a plurality of through holes 213, disposed on the right side 210, and left side 212, of the stay 200 are provided, as illustrated in pairs but may be in any configuration as understood by the skilled artisan. One half of through holes 213 pairs may be disposed on the right side 210 of stay 200 and the other half of the through holes 213 may be disposed on the left side 212 of the stay 200. Through holes 213 are provided for securing the stay to the wall W of the elevator cab shell 10 with a fastener (not shown as this is known to the skilled artisan, e.g., screw and the like).

A plurality of pairs P of pre-installed mounting clips 215 are also provided, each pair P of pre-installed mounting clips comprising a first mounting clip and a second mounting clip mounted on the front side 202, of the stay 200, wherein the first mounting clip of each pair P is pre-installed on the right side 210, of the stay at a distance D1, D2, D3, D4, from the top 206 of the stay 200, wherein D1 represents the distance from the top-most pair P to the top 206 of the stay 200, D2 represents the distance from the top 206 of the stay 200 to the pair P immediately below the topmost pair P, D3 represents the distance from the top 206 of stay 200 to the third pair P from the top 206 of stay 200 and D4 represents the distance from the top 206 of stay 200 to the lower-most pair P. Thus, a second mounting clip 215 of each pair P is pre-installed on the left side 212 of the stay 200 at the same distances, i.e., D1, D2, D3 and D4 from the top 206 of the stay 200 as the first mounting clip 215 of pair P.

In addition, stay 200 comprises at least one pre-installed locator 216 operatively connected to the stay 200, the at least one pre-installed locator 216 comprising a connected end 218 whereby the pre-installed locator 216 is connected to the front side 202 of the stay 200, a distal end 220 and a length L, whereby the pre-installed locator 216, precisely locates the position for the installation of an adjacent stay on the elevator cab shell wall W. In this embodiment, pre-installed locator 216 is operatively connected to the right side 210 of the front 202 of stay 200.

Pre-installed locator 216 may comprise a fixed deployed position as illustrated in FIG. 9, where the pre-installed locator 216 is fixed at angle α with respect to the edge E of stay 200. Preferably, this angle α is fixed at 90 degrees. Alternatively, and most preferably, pre-installed locator 216 may comprise at least two positions, a stored position and a deployed position, wherein the pre-installed locator 216 is rotatable or otherwise moveable between the stored position of FIG. 8 and the deployed position of FIG. 9. In this preferred embodiment, pre-installed locator 216 comprises a connector 219 that allows the locator 216 to rotate around connector 219 from the stored position as illustrated in, e.g., FIG. 8 to the deployed position illustrated in FIG. 9. As with the fixed position configuration for pre-installed locator 216 described above, the preferred angle α for the rotatably achieved deployed position is 90 degrees, though other angles are of course possible as will be appreciated by the skilled artisan. In practice, the pre-installed locator 216 when in the deployed position, either as a consequence of rotation away from the stored position or in the fixed position embodiment, is used to precisely mark the position, i.e., the precise horizontal distance, of an adjacent stay on the elevator cab shell wall W from the installed stay 200.

Various embodiments of the stay 200 further comprise a first lip 222 disposed at the bottom 208 of the right side 210 of the stay 200, and a second lip 224 disposed at the bottom 208 of the left side 212 of the stay 200, each of the first 222 and second 224 lips extending outwardly from the front side 202 of the stay 200 a distance that is equal to or less than the thickness T of the wall panel 12 as discussed supra in connection with FIG. 2. In certain embodiments, wall panels 12 may be supported by lips 222, 224 during installation of wall panels 12.

Figure 10:
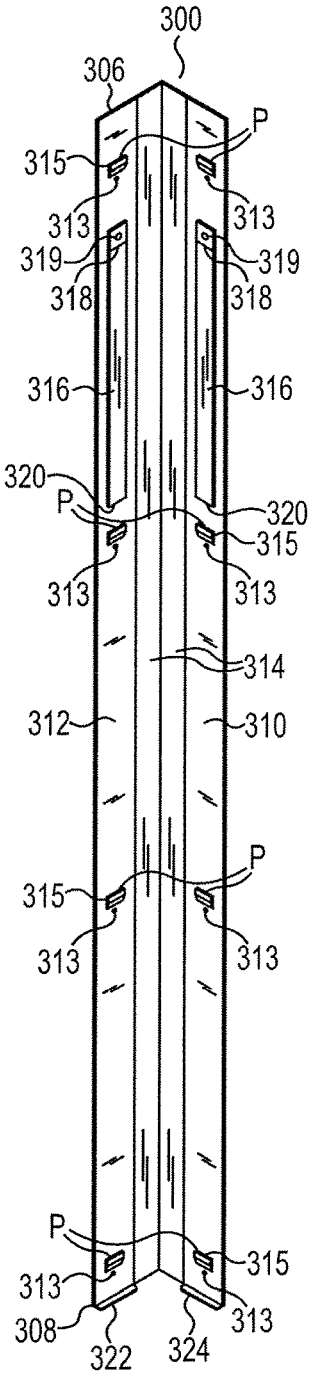
FIG. 10. is a perspective view of one embodiment of the present invention.
Figure 11:
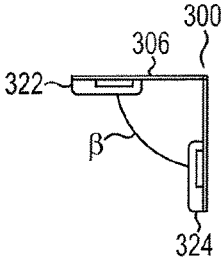
FIG. 11. is a top view of one embodiment of the present invention.
Figure 12:
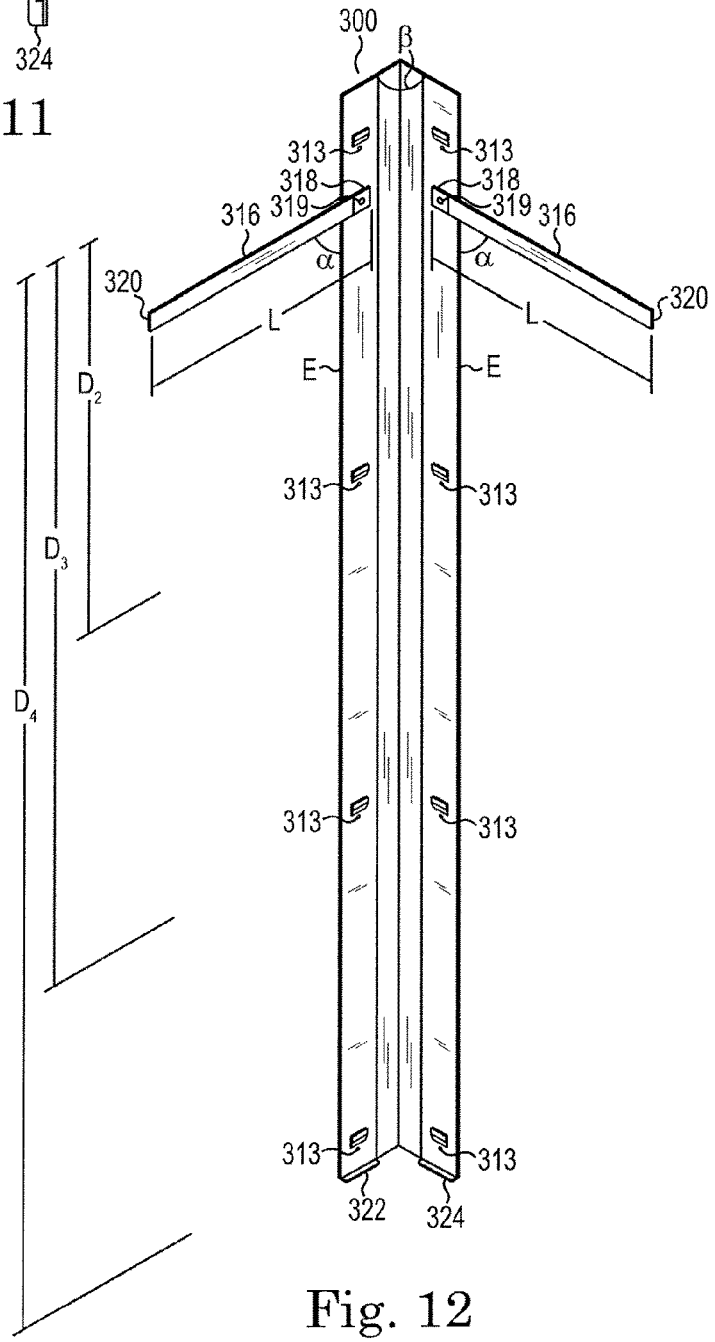
FIG. 12. is a perspective view of one embodiment of the present invention.

FIGS. 10-12 illustrate another stay embodiment 300. Thus, stay 300 may comprise a front side 302, a rear side 304, a top 306, a bottom 308, a right side 310, a left side 312, and a center portion 314 that is vertically integrated and disposed between the right side 310 and the left side 312.

Stay 300 comprises a corner piece for fitting on adjacent elevator cab shell walls W and may comprise right side 310, left side 312 and center portion 314 wherein center portion comprises an angle β. Angle β preferably comprises 90 degrees, though other angles are within the scope of the invention as the skilled artisan will readily recognize. Note that 90 degrees in this context accommodates elevator shell walls W that are disposed at right angles to each other. In the case of non-right angled elevator walls W, angle β may be modified to complement the actual angle formed by the adjacent elevator walls W. Each angle β is within the scope of the present invention.

As a consequence of the center portion 314 comprising angle β, the right side 310 and left side 312 of stay 300 are not parallel with each other. Instead, right side 310 and left side 312 are, in the preferred case where angle β is substantially 90 degrees, the right side 310 and left side 312 are disposed at substantially 90 degrees to each other.

In addition, a plurality of through holes 313, disposed on the right side 310, and left side 312, of the stay 300 are provided, as illustrated in pairs but may be in any configuration as understood by the skilled artisan. One half of through holes 313 pairs may be disposed on the right side 310 and the other half of the through holes 113 may be disposed on the left side 312 of the stay 300. Through holes 313 are provided for securing the stay 300 to the wall W of the elevator cab shell 10 with a fastener (not shown as this is a well-known structure to the skilled artisan, e.g., screw and the equivalent).

A plurality of pairs P of pre-installed mounting clips 315 are also provided, each pair P of pre-installed mounting clips comprising a first mounting clip and a second mounting clip mounted on the front side 302, of the stay 300, wherein the first mounting clip of each pair P is pre-installed on the right side 310, of the stay at a distance D1, D2, D3, D4, from the top 306 of the stay 300, wherein D1 represents the distance from the top-most pair P to the top 306 of the stay 100, D2 represents the distance from the top 306 of the stay 300 to the pair P immediately below the topmost pair P, D3 represents the distance from the top 306 of stay 300 to the third pair P from the top 306 of stay 300 and D4 represents the distance from the top 306 of stay 300 to the lower-most pair P. Thus, a second mounting clip 315 of each pair P is pre-installed on the left side 312 of the stay 300 at the same distances, i.e., D1, D2, D3 and D4 from the top 306 of the stay 300 as the first mounting clip 315 of pair P.

In addition, stay 300 in this embodiment comprises at least one pre-installed locator 316 operatively connected to the stay 300. The at least one pre-installed locators 316 may comprise a first locator 316 operatively connected to the front 302 of the right side 310 of the stay 300 and a second locator 316 operatively connected to the front 302 of the left side 312 of the stay. Each of the at least one pre-installed locators 316 comprising a connected end 318 whereby the pre-installed locator 316 is connected to the respective side (right 310 or left 312) of the front side 302 of the stay 300, a distal end 320 and a length L, whereby the pre-installed locator 316, precisely locates the position for the installation of an adjacent stay on the elevator cab shell wall W. In the illustrated embodiment, two pre-installed locators 316 are operatively connected to the right side 310, and the left side 312 of the front 302 of stay 300, thus two adjacent stays may be located with this embodiment of stay 300. Alternative embodiments may comprise one pre-installed locator 316 operatively connected to the right side 310 of the front 302 of stay 300. Another alternative may comprise one pre-installed locator 316 operatively connected to the left side 312 of the front 302 of stay 300.

Pre-installed locator 316 may comprise a fixed deployed position as illustrated in FIG. 12, where the pre-installed locator 316 is fixed at angle $\alpha$ with respect to the edge E of stay 300. Preferably, this angle $\alpha$ is fixed at 90 degrees. Alternatively, and most preferably, pre-installed locator 316 may comprise at least two positions, a stored position and a deployed position, wherein the pre-installed locator 316 is rotatable or otherwise moveable between the stored position of FIG. 10 and the deployed position of FIG. 2. In this preferred embodiment, pre-installed locator 216 comprises a connector 319 that allows the locator 316 to rotate around connector 219 from the stored position as illustrated in, e.g., FIG. 10 to the deployed position illustrated in FIG. 12. The preferred angle $\alpha$ for the rotatably achieved deployed position is 90 degrees, though other angles are of course possible as will be appreciated by the skilled artisan. In practice, the pre-installed locator 316 when in the deployed position, either as a consequence of rotation away from the stored position or in the fixed position embodiment, is used to precisely mark the position, i.e., the precise horizontal distance, of an adjacent stay on the elevator cab shell wall W from the installed stay 300.

Various embodiments of the stay 300 further comprise a first lip 322 disposed at the bottom 308 of the right side 310 of the stay 300, and a second lip 324 disposed at the bottom 308 of the left side 312 of the stay 300, each of the first 322 and second 324 lips extending outwardly from the front side 302 of the stay 300 a distance that is equal to or less than the thickness T of the wall panel 12 as discussed supra in connection with FIG. 2. In certain embodiments wall panels 12 may be supported by lips 322, 324.

Figure 13A:
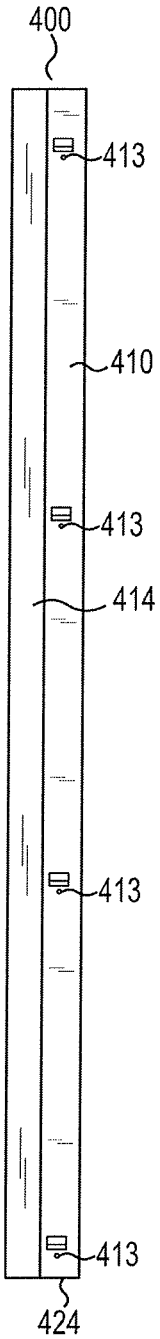
FIG. 13A. is a front view of one embodiment of the present invention.
Figure 13B:
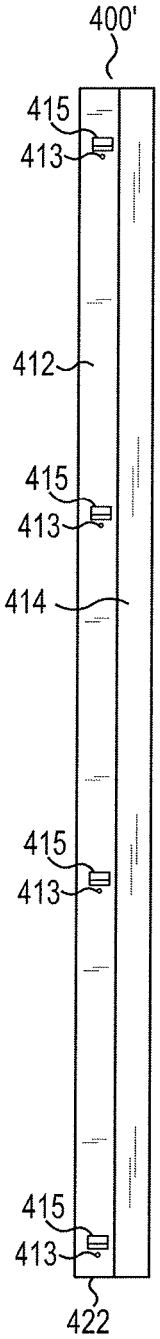
FIG. 13B is a front view of one embodiment of the present invention.

Finally, a finishing stay 400 is provided in FIGS. 13A and 13B which are mirror images of each other. The embodiment in FIG. 13A, stay 400, provides a center portion 414 and a right side 410. The embodiment in FIG. 13B, stay 400' provides a center portion and a left side 412. The preferred embodiments are illustrated, though other embodiments may comprise a pre-installed locator on the right side 410 of FIG. 13A or a pre-installed locator on the left side 412 of FIG. 13B, as those pre-installed locators are described above in connection with elements 116, 216 and 316. In addition, stay 410 comprises a lip 422 on the bottom of the right side 410 in FIG. 13A's embodiment and a lip 424 on the bottom of the left side 412 in FIG. 13B's embodiment. Lips 422, 424 are configured in the same way with the same structure and function as lips 122, 124, 222, 224, and 322, 324 described above. A single set of mounting clips 415, as opposed to the pairs P of embodiments 100, 200 and 300, are provided on either the front right side 410 of FIG. 13A or the front left side 412 of FIG. 13B. Through holes 413 are provided on either the right side 410 of FIG. 13A or the left side 412 of FIG. 13B to secure stay 400 to the elevator cab shell wall W with fasteners. Stay 400 thus provides a finishing element as will be further described herein.

Various embodiments of the structure of the present invention having been described, we now turn to the method of installation.

With reference to the Figures, with particular reference to the top view of an elevator cab shell 10 comprising a plurality of stays 100, 200, 300, 400, 400' installed therein with a plurality of wall panels 12 installed according to the above descriptions, a preferred installation method will now be described.

The installation may begin at a corner of the elevator cab shell, e.g., either at corner A or B with a measured installation of stay 300. Stay 300 will thus be installed generally vertically within the corner A formed by two adjacent walls W using a fastener and through holes 313 to affix stay 300 to walls forming corner A. The pre-installed locator 316 operatively connected to right side 310 of stay 300 is used, either as a fixed deployed element or rotated out of a stored to the extended deployed position as described above, to locate the position of the next adjacent stay 200. Proceeding along the back side of the elevator cab shell wall W between corner A and corner B, the next adjacent stay 200 is located by aligning the stay 200 against the distal end 320 of pre-installed locator 316 in deployed position and ensuring the stay 200 is substantially vertically aligned, with subsequent attachment and securement of the stay with fasteners and through holes 213 to elevator wall W. Next the next adjacent stay 100 or 200 (either stay 100 or 200 may be used in this case, subject to installer preference) is located using the pre-installed locator 216 on the previously installed stay 200 to locate the position of the next adjacent stay 100 or 200, depending on the selection of stay 100 or 200 by the installer, in the same manner as described in connection with pre-installed locator 316 and stay 200. Following location in the prescribed manner, the stay 100 or 200 is vertically aligned and affixed and secured to the elevator cab shell wall W by fasteners and through holes 113 or 213, depending on the stay selected by the installer. Stay 300 in corner B may be installed at the same time as stay 300 for corner A or following installation of the final stay 100 or 200 along wall W between corners A and B. Once stay 300 is secured in corner B in the same way stay 300 was installed in corner A, the pre-installed locator 316 on the right side of stay 300 is used as described above to locate the next adjacent stay 100 or 200 along wall between corners B and C. Once stay 100 or 200 is located in this manner, it is vertically aligned and secured using fasteners and through holes 113 or 213.

Next, proceeding along the left side of the elevator cab shell from corner A and toward corner D, the process is repeated for the second pre-installed locator 316, i.e., the locator 316 on the left side 312 of stay 300 to locate the position of the next adjacent stay 100 or 200, subject to the installer's selection of stay 100 or 200, along wall between corners A and D. The next adjacent stay 100 or 200 is then vertically aligned after locating and affixed with fasteners and through holes 113 or 213 to the elevator wall W. In the illustrated embodiment, the final stay 400 on the wall W between corners A and D is then secured using through holes 413 and fasteners.

Finally, a finishing stay 400 according to the embodiment of FIG. 13A is secured against the corner D along the wall between corners A and D by fasteners securing engaging through holes 413 to elevator cab shell wall W. Similarly, a finishing stay 400' according to the embodiment of FIG. 13B is secured against the corner C along the wall between corners B and C with fasteners engaging through holes 413 and elevator cab shell wall W.

As illustrated, the cab shell 10 on its back side, i.e., between corners A and B, requires two corner stays 300 and then two intermediate stays 100 or 200 therebetween to locate and support three wall panels 12. Each of the two intermediate stays 100 or 200 between the corner A and corner B stays 300 may be located by the pre-installed locators 316 as the skilled artisan will readily understand. In certain cab shells 10, however, more wall panels W than three may be required. In this case, the pre-installed locators of one or more of the intermediate stays 100 and/or 200 will be required to be employed to locate the next-adjacent intermediate stay 100 and/or 200 by placing the next-adjacent stay 100 and/or 200 next to the relevant extended locator 116 or 216, with subsequent vertical alignment as described above. The methods of the present invention will allow for precise locating of any number of intermediate stays 100 or 200 using an initial corner stay 300 as the basis for locating the next intermediate stays 100 or 200 on both the right side and the left side of the corner stay 300. The skilled artisan will readily appreciate the utility of the present invention and the versatility of intermediate stays 100 and 200, depending on the configuration and needs of the particular elevator cab shell 12.

At this point, following precise location and installation of stays 100, 200, 300, 400, 400', the installation of wall panels 12 begins. Each wall panel 12 comprises, as described above, a plurality of pairs of zee-type mounting clips 11 mounted to the rear side of the panel. Each of these pre-mounted pairs of zee-type mounting clips 11 now matches precisely with the plurality of pairs of pre-installed mounting clips on the right or left sides of the now-installed stays 100, 200, 300, 400 or 400' as discussed above.

Thus, beginning with the wall between corners D and A of FIG. 1's elevator cab shell 10, the first wall panel 12 is hung between stay 400 and the next adjacent stay 100 or 200. Specifically, one half of the pairs of pre-installed zee-type clips 11 of the wall panel 12 is hung or otherwise connected or secured to the pre-installed mounting clips 415 on the right side of stay 400. The other half of the pairs of pre-installed zee-type clips 11 of the wall panel 12 is hung or otherwise connected or secured to the pre-installed mounting clips 115 or 215 on the left side 112 or 212 of stay 100 or 200, depending on installer's selection of stay 100 or 200 at this point in the installation. In addition, the wall panel 12 rests on lip 424 of stay 400 and lip 122 or 222 of stay 100 or 200, depending on whether stay 100 or 200 is selected by the installer.

The next adjacent wall panel 12 along wall W from corners D to A comprising hanging one half of the pairs of the next wall panel W's pre-installed zee-type clips 11 to the pre-installed mounting clips 115 or 215 on the right side 110 or 210 of stay 100 or 200, depending on installer's selection of stay 100 or 200. The other half of the pairs of pre-installed zee-type clips 11 of wall panel W is hung on the pre-installed mounting clips 315 on the left side 312 of stay 300. In addition, wall panel 12 rests on lip 124 or 224 of stay 100 or 200 and on lip 322 of stay 300.

The installation may continue with attention to the wall spanning corners C to A of FIG. 1, though as the skilled artisan will readily understand, the installation may progress at different but substantially equivalent starting points, each equivalent installation method is within the scope of the present invention. Thus, beginning with the wall W between corners D and A of FIG. 1's elevator cab shell 10, the first wall panel 12 may be hung between stay 400' and the next adjacent stay 100 or 200, depending on which stay the installer selects for that position. Specifically, one half of the pairs of pre-installed zee-type clips 11 of the wall panel W is hung or otherwise connected or secured to the pre-installed mounting clips on the left side 412 of stay 400'. The other set of the pairs of pre-installed zee-type clips of the wall panel W is hung or otherwise connected or secured to the pre-installed mounting clips 115 or 215 on the right side 110 or 210 of stay 100 or 200, again dependent on the installer's selection of stay 100 or 100. In addition, the wall panel 12 rests on lip 422 of stay 400' and lip 124 or 224 of stay 100 or 200, depending on whether stay 100 or 200 is selected by the installer.

The next most adjacent wall panel 12 along wall W from corners C to B comprising hanging one half of the pairs of the next wall panel's 12 pre-installed zee-type clips 11 to the pre-installed mounting clips 115 or 215 on the left side 112 or 222 of stay 100 or 200. The other half of the pairs of pre-installed zee-type clips 11 of wall panel 12 is hung on the pre-installed mounting clips 315 on the right side 312 of stay 300. Wall panel 12 also rests on lip 122 or 222 of stay 100 or 200 and on lip 324 of stay 300.

Finally, the wall panels 12 along wall W between corners A and B are hung and secured. First, one half of the pairs of the wall panel 12 pre-installed zee-type clips 11 are hung on or otherwise secured to the pre-installed mounting clips 315 on the right side 310 of stay 300 which is secured to corner A. The other half of the pairs of the pre-installed zee-type clips 11 are hung on the pre-installed mounting clips on the left side 212 of stay 200. The wall panel 12 is also supported by lip 324 of stay 300 and lip 222 of stay 200.

The next most adjacent wall panel 12, moving from corner A to corner B comprises one half of the pairs of the wall panel's 12 pre-installed zee-type clips 11 being hung or secured to the pre-installed mounting clips 215 on the right side 210 of stay 200. The other half of the pairs of the wall panel's 12 pre-installed zee-type clips 11 are hung on the pre-installed mounting clips 115 or 215 on the left side 112 or 212 of stay 100 or 200, either stay 100 or stay 200 may be selected here, depending on the installer's selection and installation process as the skilled artisan will readily understand. The wall panel 12 is further supported on lip 224 of stay 200 and lip 122 or 222 of stay 100 or 200, respectively.

The third and final wall panel 12 along wall W moving from corner A to corner B, and the panel 12 proximate to corner B is installed similarly. Thus, half of the pre-installed zee-type clips on wall panel 12 are hung or secured to the pre-installed mounting clips on the right side 110 or 210 of stay 100 or 200. The other half of the pre-installed zee-type clips of wall panel 12 are hung on the pre-installed mounting clips on the left side 112 or 210 of stay 100 or 200. Finally, this wall panel 12 is supported by lip 124 or 224 of stay 100 or 200, depending on which stay 100 or 200 the installer selected, as well as lip 322 of stay 300, completing wall panel 12 installation of wall between corners A and B.

In the case where the locators 116, 216, 316 are rotatable, the locators may be rotated down into the stored position before hanging the wall panels 12 as described herein. If locators 116, 216, 316 are not rotatable, wall panels 12 are simply installed over the locators 116, 216, 316, as described above.

In each case, the wall panels 12 are supported by two stays, the right and left sides of the stays are covered by the secured and installed wall panels 12, leaving the center portion 114, 214, 314, 414, uncovered by wall panels 12 for visual effect. The center portions 114, 214, 314, 414 are commonly known as reveals and may be formed of a metal, e.g., stainless steel. The stays 100, 200, 300, 400, 400' may be formed of metal.

Thus, a preferred method for the present invention for precisely locating and installing a wall panel between two vertically located and installed stays on a wall of an elevator cab shell having a ceiling and a floor, the wall panel having a front side, a rear side, a height, a width, a top side, a bottom side and a thickness may comprise:

providing a plurality of pairs of zee-type mounting clips mounted to the rear side of each of the plurality of wall panels;

providing a plurality of vertically mounted stays, each stay comprising a front side, a rear side, a top, a bottom, a right side, a left side and a center vertically disposed between the right side and the left side, a plurality of pairs of pre-installed mounting clips, each pair of pre-installed mounting clips comprising a first and a second mounting clip mounted on the front side of the stay, each pair of pre-installed mounting clips being the same distance from the top of the stay, wherein the first mounting clip is pre-installed on the right side of the stay and the second mounting clip is pre-installed on the left side of the stay, and at least one pre-installed locator operatively connected to the stay, the at least one pre-installed locator comprising a connected end whereby the locator is connected to the stay, a distal end and a length;

locating and installing a first stay of the plurality of stays in a substantially vertical position on the elevator cab shell;

locating and installing a second stay of the plurality of stays adjacent to and at a distance from the first located and installed stay using the length of the pre-installed locator on the first stay to determine the location for the second stay; and hanging a wall panel between the first and second located and installed stays by mating the pre-installed mounting clips on the rear side of the wall panel with the pre-installed zee-type clips on each of the located and installed stays.

This preferred method may further comprise providing wall panels having a height that is approximately 1.5 inches less than the height of the walls elevator cab shell and locating the first stay on a wall of the elevator cab shell to achieve a clearance of about 0.5 inches from the bottom side of the wall panel to the elevator cab shell floor and about 1 inch from the top side of the wall panel to the elevator cab shell ceiling.

The invention has been described with reference to various specific and preferred embodiments and techniques. However, it should be understood that many variations and modifications may be made while remaining within the spirit and scope of the invention.

We claim:

1. A *wall panel and* stay *system* for mounting a wall panel on a wall within an elevator cab shell having a ceiling and a floor[, the wall panel having a front side, a rear side, a height, a width and a thickness, the rear side of the wall panel comprising a plurality of pairs of pre-installed mounting clips thereon], the *wall panel and* stay *system* comprising:

*a wall panel having a front side, a rear side, a height, a width, and a thickness, the rear side of the wall panel comprising a plurality of pairs of pre-installed or pre-punched mounting mechanisms thereon; and*

*a stay comprising:* a front side, a rear side, a top, a bottom, a right side, a left side and a center portion vertically integrated between the right side and the left side;

a plurality of through holes disposed on the right and left sides of the stay for securing the stay to the wall of the elevator cab with a fastener;

a plurality of pairs of pre-installed mounting clips, each pair of pre-installed mounting clips comprising a first mounting clip and a second mounting clip mounted on the front side of the stay, wherein the first mounting clip of each pair is pre-installed on the right side of the stay at a distance from the top of the stay and the second mounting clip of each pair is pre-installed on the left side of the stay at the same distance from the top of the stay as the first mounting clip;

[at least one pre-installed locator operatively connected to the stay, the at least one pre-installed locator comprising a connected end whereby the locator is connected to the front side of the stay, a distal end and a length, whereby the locator precisely locates the position for the installation of an adjacent stay on the elevator cab shell;]

a first lip disposed at the bottom of the right side of the stay; and a second lip disposed at the bottom of the left side of the stay, wherein each of the first and second lips extends perpendicularly away from the front side of the stay in a direction opposite the rear side of the stay a distance that is adapted to be equal to or less than the thickness of the wall panel.

2. The stay of claim 1, wherein the wall panel comprises four pairs of pre-installed [mounting clips] *or pre-punched mounting mechanisms* and the stay comprises four pairs of pre-installed mounting clips.

3. The stay of claim [1] *20*, wherein the at least one locator is rotatably connected to the front side of the stay.

4. The stay of claim 3, wherein the at least one locator is rotatably connected to the right side of the stay.

5. The stay of claim 3, wherein the at least one locator is rotatably connected to the left side of the stay.

6. The stay of claim 3, wherein a first locator is rotatably connected to the right side of the stay and a second locator is rotatably connected to the left side of the stay.

7. The stay of claim 3, wherein the at least one locator is rotatable from a first stored position to a second deployed locating position.

8. The stay of claim 1, wherein the stay is manufactured from at least one metal.

9. The stay of claim 8, wherein the center of the stay comprises stainless steel.

10. The stay of claim [1] *9*, wherein the right and left sides of the stay comprise a metal that is not stainless steel.

11. The stay of claim 1, further comprising the front side of the right side, the front side of the left side and the front side of the center portion of the stay being parallel to each other.

12. The stay of claim 1, wherein the front side of the right side and the front side of the left side of the stay are disposed at a 90 degree angle to each other.

13. The stay of claim 12, wherein the center portion comprises a right center portion and a left center portion, the right center portion and the left center portion disposed at a 90 degree angle to each other.

14. The stay of claim [13] *21*, wherein a first pre-installed locator is connected to the right side of the stay.

15. The stay of claim 14, wherein the first pre-installed locator is rotatably connected to the right side of the stay and is rotatable from a first stored position to a second deployed locating position.

16. The stay of claim 14, wherein a second pre-installed locator is connected to the left side of the stay.

17. The stay of claim 16, wherein the second pre-installed locator is rotatably connected to the right side of the stay and is rotatable from a first stored position to a second deployed locating position.

18. A method for precisely locating and installing a wall panel between two vertically located and installed stays on a wall of an elevator cab shell having a ceiling and a floor, the wall panel having a front side, a rear side, a height, a width, a top side, a bottom side and a thickness, comprising:

providing a plurality of pairs of mounting [clips] *mechanisms at least one of* mounted to*, pre-installed on, or pre-punched in* the rear side of [each of] the [plurality of] wall [panels] *panel*;

providing a plurality of vertically mounted stays, each stay comprising*:* a front side, a rear side, a top, a bottom, a right side, a left side and a center vertically disposed between the right side and the left side, a first lip disposed at the bottom of the right side of the stay[;], and a second lip disposed at the bottom of the left side of the stay, wherein each of the first and second lips extends perpendicularly away from the front side of the stay in a direction opposite the rear side of the stay a distance that is adapted to be equal to or less than the thickness of the wall panel; *and* a plurality of pairs of pre-installed mounting clips, each pair of pre-installed mounting clips comprising a first and a second mounting clip mounted on the front side of the stay, *the first and second mounting clip of* each pair of pre-installed mounting clips being the same distance from the top of the stay, wherein the first mounting clip is pre-installed on the right side of the stay and the second mounting clip is pre-installed on the left side of the stay[, and at least one pre-installed locator operatively connected to the stay, the at least one pre-installed locator comprising a connected end whereby the locator is connected to the stay, a distal end and a length];

locating and installing a first stay of the plurality of stays in a substantially vertical position on the elevator cab shell;

locating and installing a second stay of the plurality of stays [adjacent to and] at a distance from the first located and installed stay [using the length of the pre-installed locator on the first stay to determine the location for the second stay]; and hanging a wall panel between the first and second located and installed stays by mating *a first half of* the pre-installed *pairs of* mounting [clips] *mechanisms* on the rear side of the wall panel with *at least some of* the pre-installed mounting clips on [each of] the *first* located and installed [stays] *stay and mating a second half of the pre-installed pairs of mounting mechanisms on the rear side of the wall panel with at least some of the pre-installed mounting clips on the second located and installed stay,* and supporting the wall panel on the first lip *of one of the first and second located and installed stays and the second lip of the other of the located and installed stays*.

19. The method of claim 18, further comprising providing wall panels having a height that is approximately 1.5 inches less than the height of the walls elevator cab shell and locating the first stay on a wall of the elevator cab shell to achieve a clearance of about 0.5 inches from the bottom side of the wall panel to the elevator cab shell floor and about 1 inch from the top side of the wall panel to the elevator cab shell ceiling.

*20. The stay of claim 1, further comprising at least one pre-installed locator operatively connected to the stay, the at least one pre-installed locator comprising a connected end whereby the locator is connected to the front side of the stay, a distal end and a length, whereby the locator precisely locates the position for the installation of an adjacent stay on the elevator cab shell.*

*21. The stay of claim 13, further comprising at least one pre-installed locator operatively connected to the stay, the at least one pre-installed locator comprising a connected end whereby the locator is connected to the front side of the stay, a distal end and a length, whereby the locator precisely locates the position for the installation of an adjacent stay on the elevator cab shell.*

*22. The wall panel and stay system of claim 1, wherein the wall panel is operably attached to the stay such that one pre-installed or pre-punched mounting mechanism of each of the plurality of pairs of pre-installed or pre-punched mounting mechanisms thereon is operably attached to a corresponding first mounting clip on the stay, thereby covering each of the first mounting clips of the stay but not the second mounting clips of the stay.*

*23. The wall panel and stay system of claim 1, wherein the wall panel is operably attached to the stay such that one pre-installed or pre-punched mounting mechanism of each of the plurality of pairs of pre-installed or pre-punched mounting mechanisms thereon is operably attached to a corresponding second mounting clip on the stay, thereby covering each of the second mounting clips of the stay but not the first mounting clips of the stay.*

*24. A system for mounting a wall panel on a wall within an elevator cab shell having a ceiling and a floor, the system comprising:*

*a wall panel having a front side, a rear side, a height, a width, and a thickness, the rear side of the wall panel comprising a plurality of pairs of pre-installed or pre-punched mounting mechanisms thereon; and*

*a vertically mounted strip comprising:*

*a front side, a rear side, a top, a bottom, a right side, a left side, with the front side of the strip including a right side portion, a left side portion, and a center portion vertically integrated between the right side portion and the left side portion;*

*a plurality of through holes disposed on the right and left side portions of the strip for securing the strip to the wall of the elevator cab with a fastener;*

*a plurality of pairs of pre-installed mounting clips, each pair of pre-installed mounting clips comprising a first mounting clip and a second mounting clip mounted on the front side of the strip, wherein the first mounting clip of each pair is pre-installed on the right side portion of the strip and the second mounting clip of each pair is pre-installed on the left side portion of the strip; and*

*a lip adjacent the bottom of the strip that extends perpendicularly away from the front side of the strip in a direction opposite the rear side of the strip a distance that is adapted to be equal to or less than the thickness of the wall panel.*

*25. A method for locating and installing a wall panel between two vertically located and installed strips on a wall of an elevator cab shell having a ceiling and a floor, the wall panel having a front side, a rear side, a height, a width, a top side, a bottom side and a thickness, comprising:*

*providing a plurality of pairs of mounting mechanisms at least one of mounted to, preinstalled on, or pre-punched in the rear side of the wall panel;*

*providing an elevator cab wall mounted system comprising:*

*a plurality of wall mountable strips, each having a front side, a rear side, a top, a bottom, a right side, a left side, a center portion vertically disposed between the right side and the left side, and a plurality of through holes disposed on the right and left sides for securing the strip to the wall of the elevator cab with a fastener;*

*a plurality of pairs of pre-installed mounting clips provided on each strip, each pair of pre-installed mounting clips comprising a first mounting clip pre-installed on the right side of the strip and a second mounting clip pre-installed on the left side of the strip; and*

*at least one lip adjacent the bottom of the strips that extends perpendicularly away from the front side of the strips in a direction opposite the rear side of the strips a distance that is adapted to be equal to or less than the thickness of the wall panel;*

*locating and installing a first strip of the plurality of strips in a substantially vertical position on the elevator cab shell;*

*locating and installing a second strip of the plurality of strips at a distance from the first located and installed strip; and*

*hanging a wall panel between the first and second located and installed strips by mating a first half of the pairs of mounting mechanisms on the rear side of the wall panel with at least some of the pre-installed mounting clips on the first located and installed strip and mating a second half of the pairs of mounting mechanisms on the rear side of the wall panel with at least some of the pre-installed mounting clips on the second located and installed strip, and supporting the wall panel on the at least one lip.*

* * * * *